United States Patent [19]
Dole et al.

[11] Patent Number: 5,242,620
[45] Date of Patent: Sep. 7, 1993

[54] GADOLINIUM LUTETIUM ALUMINATE PHOSPHOR WITH CERIUM LUMINESCENCE

[75] Inventors: Stephen L. Dole, Burnt Hills; Subramaniam Venkataramani, Clifton Park, both of N.Y.

[73] Assignee: General Electric Company, Schenectady, N.Y.

[21] Appl. No.: 908,117

[22] Filed: Jul. 2, 1992

[51] Int. Cl.⁵ .............................................. C09K 11/80
[52] U.S. Cl. ........................................... 252/301.4 R
[58] Field of Search ............................... 252/301.4 R

[56] References Cited

FOREIGN PATENT DOCUMENTS 292616 11/1988 European Pat. Off. ..... 252/301.4 R

OTHER PUBLICATIONS

Kasei "Chem. Abstracts", vol. 94, 1981, 75542c.
Mat. Res. Bull. vol. 11, pp. 1-10, 1976. Pergamon Press, Inc. J. Fava, G. Le Flam, "Transfert d'Energie Entre Les Ions Ce3+ET Tb3+Dans GdAlO3".

Primary Examiner—Jack Cooper
Attorney, Agent, or Firm—James E. McGinness; James Magee, Jr.

[57] ABSTRACT

A phosphor is disclosed comprised of an effective amount of cerium to provide luminescence, and the balance substantially a gadolinium lutetium aluminate compound having the formula $Gd_xLu_{1-x}AlO_3$, where x ranges from about 0.25 to 0.9.

3 Claims, 1 Drawing Sheet

GADOLINIUM LUTETIUM ALUMINATE PHOSPHOR WITH CERIUM LUMINESCENCE

BACKGROUND OF THE INVENTION

This invention relates to a cerium activated phosphor for computerized tomography and other X-ray, gamma radiation, and nuclear radiation detecting applications. More specifically, the invention relates to a gadolinium lutetium aluminate phosphor having cerium luminescence.

Computerized tomography scanners are diagnostic instruments used in industrial and medical imaging. A body is exposed to a relatively planar beam or beams of radiation, such as x-ray or gamma ray radiation, the intensity of which varies in direct relationship to the energy absorption along a plurality of body paths. By measuring the radiation intensity along these paths from a plurality of different angles or views, a radiation absorption coefficient can be computed for various areas in any plane of the body through which the radiation passes. The absorption coefficients are used to produce a display of, for example, bodily organs intersected by the radiation.

Phosphors can be used to form scintillators which are excited by the impinging X-ray or gamma radiation, and emit optical wave length radiation. The optical output from the scintillator material is made to impinge upon photo electrically responsive materials in order to produce electrical output signals. The amplitude of the signals is directly related to the intensity of the impinging X-ray or gamma radiation. The electrical signals are digitized for processing by digital computer means which generate the absorption coefficients in a form suitable for display on a cathode ray tube screen or other permanent media.

In general, it is desirable that the amount of light output from the phosphors and resulting scintillator be as large as possible for a given amount of X-ray or gamma ray energy. This is particularly true in the medical tomography area where it is desired that the energy intensity of the X-ray be as small as possible to minimize any danger to the patient.

The photo electrically responsive material, such as a photomultiplier, that senses the light emitted by the phosphor provides greater sensitivity to light of certain wavelengths. For example, FIG. 1 shows the sensitivity of one known photomultiplier system to light at various wavelengths, the greatest sensitivity being for light having a wavelength of about 400 nanometers. Therefore, it is considered a significant improvement to form phosphors that emit more light at the wavelengths that the photomultiplier is most sensitive. In other words, a significant improvement in computerized tomography scanners can be achieved by forming a phosphor having, for example, twice the light output of known phosphors at the wavelengths of light the photomultiplier has the highest sensitivity.

Another important property that the phosphor material should possess is that of short afterglow, persistence, or decay time constant. As used herein, the term "decay time constant" means the time for luminescence output to decay to about 36.8 percent of the maximum light output after the excitation radiation ceases. This means that there should be a relatively short period of time between the termination of the high energy radiation excitation and the cessation of light output from the phosphor or scintillator. If this is not the case, there is a blurring, in time, of the information bearing signal generated, for example, when the scintillator is used to produce tomographic imaging data. Furthermore, if rapid tomographic scanning is desired, the presence of the afterglow tends to severely limit the scan rate, thereby rendering difficult the view of moving bodily organs, such as the heart or lungs.

Positron emission tomography scanners utilize gamma ray detector systems. The detector system is capable of capturing gamma rays and converting them into a luminescent output. The luminescent output is converted by means of a photo multiplier into an electrical signal. Bismuth germanate has the necessary high stopping power required for capturing gamma radiation, and has been used in gamma ray detection systems. The gamma ray stopping power of bismuth germanate has been measured to be about 0.955 per centimeter. The decay time constant for bismuth germanate is about 300 nanoseconds.

It is an object of this invention to provide a phosphor comprised of cerium in a gadolinium lutetium aluminate compound.

It is another object of this invention to provide a phosphor having a high gamma ray stopping power, e.g., comparable to bismuth germanate.

It is another object of this invention to provide a phosphor having a high gamma ray stopping power, and a fast decay time constant, e.g., less than the 300 nanosecond decay time constant for bismuth germanate.

BRIEF DESCRIPTION OF THE INVENTION

The phosphors of this invention are comprised of an effective amount of cerium to provide luminescence, and the balance substantially a gadolinium lutetium aluminate compound having the formula $Gd_xLu_{1-x}AlO_3$, where x ranges from about 0.25 to 0.9, preferably x ranges from about 0.35 to 0.75.

DETAILED DESCRIPTION OF THE INVENTION

Figure 1:
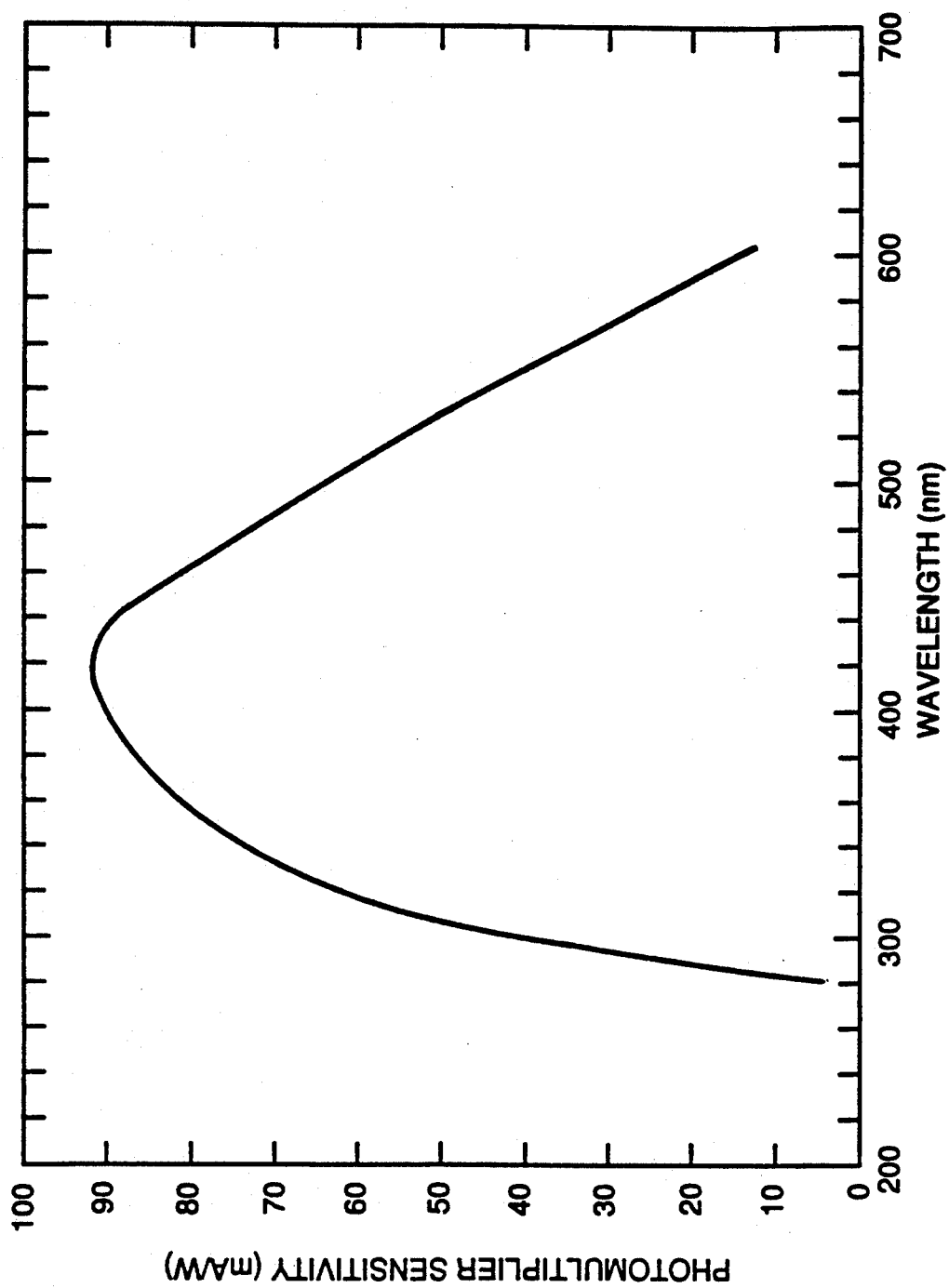
FIG. 1 is a graph showing the sensitivity of a conventional photomultiplier in milliamps per watt of signal output to light at various wavelengths.

The phosphors of this invention may be used in a wide variety of applications as cathodoluminescent or photoluminescent emitters. For example, the phosphors can be distributed in the scintillator structures disclosed in U.S. Pat. Nos. 4,362,946 and 4,230,510, incorporated herein by reference. Such scintillator structures provide optical coupling of luminescence from the phosphor distributed in the scintillator to photoelectrically responsive devices.

The phosphor of this invention is formed from a gadolinium lutetium aluminate compound having the formula $Gd_xLu_{1-x}AlO_3$, where x ranges from about 0.25 to 0.9, preferably about 0.35 to 0.75. The phosphor is comprised of cerium in an effective amount to provide luminescence when exposed to ultraviolet or higher energy radiation. Preferably cerium substitutes for about 0.01 to 5 mole percent of the gadolinium and lutetium in the compound, and most preferably about 0.5 to 1 mole percent. The oxide compound of this invention comprised of cerium, gadolinium, lutetium, and aluminate is sometimes herein referred to as the "gadolinium lutetium aluminate compound."

The phosphors can be formed by conventional methods well known in the art for forming oxide phosphor powders, for example disclosed in U.S. Pat. No. 4,424,671, incorporated herein by reference. Briefly described, a mixture is formed of aluminum, gadolinium, lutetium, and cerium oxides, or oxo-salts such as oxalates, carbonates, hydroxides, and nitrates that decompose to form the oxides. The gadolinium, lutetium, and aluminum oxides or oxo-salts are mixed in the ratio that forms the gadolinium lutetium aluminate compound.

The mixing can be carried out in an agate mortar and pestle or in a ball mill using water, heptane, or an alcohol such as ethyl alcohol as a liquid vehicle. Suitable milling media that are non-contaminating to the phosphor, i.e. reduce the light emitting properties, are zirconia or Teflon synthetic resin polymers. Dry milling may also be used for both mixing and breakup of powder aggregates. If dry milling is employed, a grinding aid such as 1 to 5 weight percent of stearic acid or oleic acid should be employed to prevent powder packing or sticking inside the ball mill.

If the mixture is formed from the oxo-salts such as the nitrates, carbonates, hydroxides, or oxalates, a calcining step is required to obtain the corresponding oxides. The oxo-salts can be calcined in an oxidizing atmosphere such as air at about 700° to 1000° C. The oxide mixture is heat treated in an inert atmosphere such as nitrogen, helium, hydrogen, air, or a vacuum to form the gadolinium lutetium aluminate compound. The gadolinium lutetium aluminate compound can be formed by heating to about 1500° to 800° C. for several hours. The heat treatments to calcine and form the gadolinium lutetium aluminate compound can be performed in a single heating step by heating to about 1500° to 1800° C. in the inert atmosphere.

EXAMPLE

Phosphor powders were formed by mixing aluminum oxide, and the oxalate salts of gadolinium and lutetium in the ratio to form the gadolinium lutetium aluminate compounds shown in Table 1 below. About 1 mole percent of the gadolinium and lutetium in the gadolinium lutetium aluminate compounds was substituted with cerium. A gadolinium aluminate powder was formed by mixing aluminum oxide and the oxalate salt of gadolinium in the ratio to form the gadolinium aluminate compound shown in Table 1 below. About 1 mole percent of the gadolinium in the gadolinium lutetium aluminate compound was substituted with cerium. The mixtures were heated to 1600° C. in an atmosphere comprised of 10 volume percent hydrogen and the balance nitrogen for about 4 hours to form the respective compounds.

The powders were inspected by X-ray diffraction and found to have the distorted perovskite crystal form of gadolinium aluminate. The light emission of the powders was measured by UV spectrophotometer, and the gamma ray stopping power was determined by calculation from the attenuation coefficient of the constituent elements. The peak light emission of the compounds is shown below in Table I.

TABLE I

| Composition | Peak of Light Emission (nanometers) | Relative Peak Intensity | Relative Intensity at 400 nanometers |
|---|---|---|---|
| $GdAlO_3$ | 350 | 1.5 | 0.25 |
| $Gd_{0.9}Lu_{0.1}AlO_3$ | 360 | 1.3 | 0.4 |
| $Gd_{0.75}Lu_{0.25}AlO_3$ | 360 | 2.7 | 1.3 |
| $Gd_{0.6}Lu_{0.4}AlO_3$ | 365 | 3 | 1.5 |
| $Gd_{0.45}Lu_{0.55}AlO_3$ | 365 | 2.9 | 1.5 |
| $Gd_{0.4}Lu_{0.6}AlO_3$ | 365 | 3.2 | 1.8 |
| $Gd_{0.3}Lu_{0.7}AlO_3$ | 370 | 0.4 | 0.35 |

Note: 1 mole percent Ce substituted for Gd, or Gd and Lu in each compound.

The decay time constant of light emitted from the phosphor powders after excitation by radiation was measured by the delayed coincidence method as disclosed for example in "Measurement of the Time Dependence of Scintillator Intensity by a Delayed Coincidence Method," L.M. Bollinger and C.E. Thomas, Review Scientific Instruments, vol. 32, 1961, pp. 1044–1050, incorporated herein by reference. The decay time constant and calculated gamma ray stopping power for the compounds are shown below in Table II. The gamma ray stopping power and decay time constant of a conventional bismuth germanate powder are shown for comparison in Table II.

TABLE II

| Composition | Gamma Ray Stopping Power ($cm^{-1}$) | Decay Time Constant (nano-seconds) |
|---|---|---|
| $GdAlO_3$ | 0.76 | 17 |
| $Gd_{0.9}Lu_{0.1}AlO_3$ | 0.78 | |
| $Gd_{0.75}Lu_{0.25}AlO_3$ | 0.81 | |
| $Gd_{0.6}Lu_{0.4}AlO_3$ | 0.84 | 16 |
| $Gd_{0.45}Lu_{0.55}AlO_3$ | 0.87 | |
| $Gd_{0.4}Lu_{0.6}AlO_3$ | 0.88 | |
| Bismuth Germanate | 0.955 | 300 |

Note: 1 mole percent Ce substituted for Gd, or Gd and Lu in each compound.

A visual comparison of the light output of the gadolinium lutetium aluminate powders was made with bismuth germanate, and the light output of the gadolinium lutetium aluminate powders was observed to be comparable to or better than the bismuth germanate.

Referring to Table I, the gadolinium lutetium aluminate compound phosphors of this invention having cerium luminescence provide a comparable gamma radiation stopping power to bismuth germanate, with a decay time constant of emitted light that is about an order of magnitude less. The gadolinium lutetium aluminate compounds wherein lutetium is about 25 to 65 mole percent of the gadolinium and lutetium in the compound, have about twice the intensity of peak light output as compared to the gadolinium aluminate, and at least about 5 times the light output at 400 nanometers.

What is claimed is:

1. A phosphor comprising:
   an oxide compound having the formula $Gd_xLu_{1-x}AlO_3$, where x is in the range of from about 0.35 to 0.75, the oxide compound having an effective amount of cerium to provide luminescence when excited by ultraviolet or higher energy radiation, the effective amount of cerium substituting for Gd and Lu in the compound.

2. A phosphor according to claim 1 wherein the cerium substitues for about 0.01 to 5 mole percent of the Gd and Lu.

3. A phosphor according to claim 2 wherein the cerium substitues for about 0.5 to 1 mole percent of the Gd and Lu.

* * * * *